(12) United States Patent
Kamen (10) Patent No.: US 7,002,590 B2
(45) Date of Patent: Feb. 21, 2006

(54) MODIFYING OBJECT GEOMETRY TO ACCOMMODATE INFORMATION ATTRIBUTES

(76) Inventor: Yakov Kamen, 19334 Greenwood Dr., Cupertino, CA (US) 95014

( * ) Notice: Subject to any disclaimer, the term of this patent is extended or adjusted under 35 U.S.C. 154(b) by 119 days.

(21) Appl. No.: 10/059,943

(22) Filed: Jan. 28, 2002

(65) Prior Publication Data

US 2002/0113798 A1 Aug. 22, 2002

Related U.S. Application Data

(60) Provisional application No. 60/268,582, filed on Feb. 13, 2001.

(51) Int. Cl.
*G09G 5/00* (2006.01)

(52) U.S. Cl. .................. 345/581; 345/582; 345/583; 345/585; 345/600

(58) Field of Classification Search .............. 345/581, 345/582, 583, 585, 600, 671, 760, 684, 685, 345/688
See application file for complete search history.

(56) References Cited

U.S. PATENT DOCUMENTS

| | | | |
|---|---|---|---|
| 4,621,259 A | 11/1986 | Schepers et al. | |
| 5,243,418 A | 9/1993 | Kuno et al. | |
| 5,262,965 A * | 11/1993 | Putnam et al. | 395/101 |
| 5,414,773 A | 5/1995 | Handelman | |
| 5,479,268 A | 12/1995 | Young et al. | |
| 5,485,197 A | 1/1996 | Hoarty | |
| 5,532,754 A | 7/1996 | Young et al. | |
| 5,550,576 A | 8/1996 | Klosterman | |
| 5,684,525 A | 11/1997 | Klosterman | |
| 5,704,837 A | 1/1998 | Iwasaki et al. | |
| 5,724,492 A | 3/1998 | Matthews, III et al. | |
| 5,737,028 A | 4/1998 | Bertram et al. | |
| 5,751,282 A | 5/1998 | Girard et al. | |
| 5,808,613 A | 9/1998 | Marrin et al. | |
| 5,818,441 A | 10/1998 | Throckmorton et al. | |
| 5,828,945 A | 10/1998 | Klosterman | |
| 5,841,563 A | 11/1998 | Effenberger | |
| 5,900,915 A | 5/1999 | Morrison | |
| 5,923,362 A | 7/1999 | Klosterman | |
| 5,926,168 A | 7/1999 | Fan | |
| 5,929,849 A | 7/1999 | Kikinis | |
| 5,940,073 A | 8/1999 | Klosterman et al. | |
| 5,943,053 A * | 8/1999 | Ludolph et al. | 715/790 |
| 5,956,456 A | 9/1999 | Bang et al. | |
| 5,977,964 A | 11/1999 | Williams et al. | |
| 5,999,167 A | 12/1999 | Marsh et al. | |
| 5,999,187 A | 12/1999 | Dehmlow et al. | |
| 6,002,403 A | 12/1999 | Sugiyama et al. | |
| 6,029,195 A | 2/2000 | Herz | |
| 6,043,818 A | 3/2000 | Nakano | |
| 6,061,055 A | 5/2000 | Marks | |
| 6,072,983 A | 6/2000 | Klosterman | |
| 6,075,575 A | 6/2000 | Schein et al. | |

(Continued)

FOREIGN PATENT DOCUMENTS

JP 410093880 A 4/1998

(Continued)

*Primary Examiner*—Matthew C. Bella
*Assistant Examiner*—Tam Tran
(74) *Attorney, Agent, or Firm*—Todd S. Parkhurst; Holland & Knight LLP (57) ABSTRACT

One or more information attributes about an object is received. A determination is performed to find out if the one or more information attributes is in contention with geometry attributes of the object. When the one or more information attributes is in contention with the geometry attributes, the geometry attributes are modified to avoid contention with the one or more information attributes.

12 Claims, 5 Drawing Sheets

U.S. PATENT DOCUMENTS

| | | |
|---|---|---|
| 6,078,348 A | 6/2000 | Klosterman et al. |
| 6,081,271 A | 6/2000 | Bardon et al. |
| 6,167,188 A | 12/2000 | Young et al. |
| 6,205,485 B1 | 3/2001 | Kikinis |
| 6,233,389 B1 | 5/2001 | Barton et al. |
| 6,243,039 B1 | 6/2001 | Elliot |
| 6,271,831 B1 | 8/2001 | Escobosa et al. |

FOREIGN PATENT DOCUMENTS

| | | |
|---|---|---|
| WO | WO 00/01149 A1 | 1/2000 |

* cited by examiner

MODIFYING OBJECT GEOMETRY TO ACCOMMODATE INFORMATION ATTRIBUTES

This utility application is claiming priority to a provisional application filed on Feb. 13, 2001 having the Ser. No. 60/268,582.

FIELD OF THE INVENTION

The present invention relates generally to field computer graphics, more specifically, the present invention is directed to a method and an apparatus for maintaining texture maps.

BACKGROUND

A texture map is a pixel-mapped image that can be stored in memory and applied to polygons during image processing. Each point in the map represents an average color or intensity for a specific area of an image. When applying a texture map to objects in 3-D space, typically such an object is created with a fixed geometry. A texture map is then applied in a manner to allow the texture to fit into that fixed geometry.

Typically, the texture map contains background texture. However, in some situations, the texture map may also contain meaningful information. In these situations, it may be desirable to modify the geometry of the object to match the information contained in the texture map, rather than changing the attributes of the information to match the geometry. For example, when the texture map contains meaningful information, such as a word, and the word needs to appear within an object, it may be desirable to expand the geometry of the object. This allows the word to appear in full size within the object, as compared to shrinking the word and thus affecting the information.

What is clearly needed is a novel method that allows geometries or geometric pipeline parameters (translucency, lighting) to be modified to accommodate to the attributes of information present in one or more textures.

SUMMARY OF THE INVENTION

In one embodiment, a method for accommodating information attributes is disclosed. At least one information attribute about an object is received. A determination is performed to find out if the at least one information attribute is in contention with one or more geometry attributes of the object. When the at least one information attribute is in contention with the one or more geometry attributes, the one or more geometry attributes are modified to avoid contention with the at least one information attribute.

Other features of the present invention will be apparent from the accompanying drawings and from the detailed description which follows.

BRIEF DESCRIPTION OF THE DRAWINGS

The following drawings disclose various embodiments of the present invention for purposes of illustration only and are not intended to limit the scope of the invention.

DETAILED DESCRIPTION

In one embodiment, a method for modifying geometries of objects to accommodate information attributes of the objects is disclosed. When the information attributes are received, a determination is performed to find out if contention exists between the information attributes and geometry attributes of the objects. When contention exists, the geometry attributes are modified to match with the information attributes. The information attributes are used to form texture maps to be applied to the objects.

In the following description, for purposes of explanation, numerous specific details are set forth in order to provide a thorough understanding of the present invention. It will be evident, however, to one skilled in the art that the present invention may be practiced without these specific details. In other instances, well-known structures, processes and devices are shown in block diagram form or are referred to in a summary manner in order to provide an explanation without undue detail.

Figure 1:
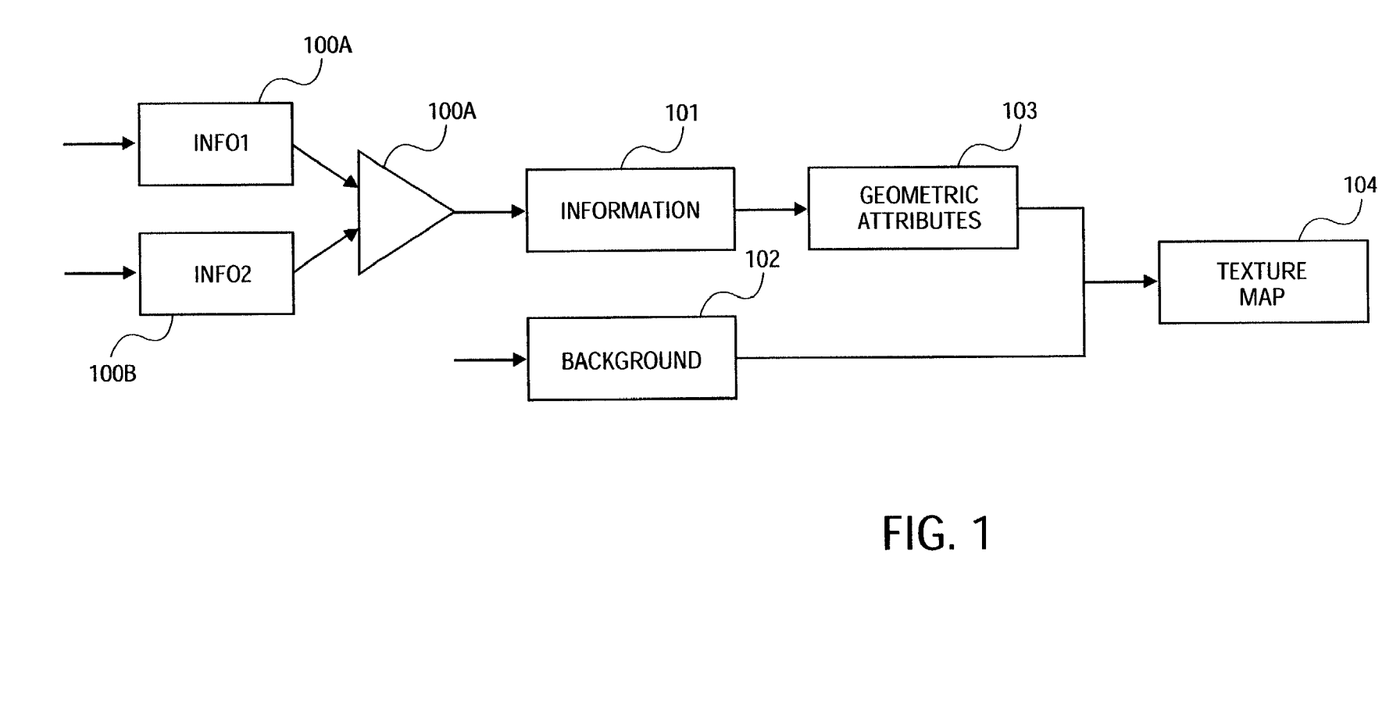
FIG. 1 is a diagram illustrating an example of a prior art graphics pipeline.

FIG. 1 is a diagram illustrating an example of a prior art graphics pipeline. The pipeline creates an object comprising geometry, background, and information. Information 101 and background texture (or textures) 102 are received into the pipeline separately. In a case when there are multiple "informative textures" (i.e., texture that signifies information, such as, for example, blue=cold, red=hot), the multiple "informative textures" are aggregated. For example, the information textures 100A and 100B are aggregated by the decision block 102A to form the aggregated information.

The information (or aggregated information) is analyzed in block 103 and the geometry attributes matching the geometry are generated to allow the information to fit properly into the geometry. The geometry attributes and the background attributes are applied into a texture map in block 104. The texture map is then applied to the geometry of the object to create a complete object. With this prior art approach, the information attributes are dependent on the geometry attributes, and as such, may have to be resized, for example, to fit with the geometry attributes. Such resizing of the information attributes may cause loss of "informative" content.

Figure 2A:
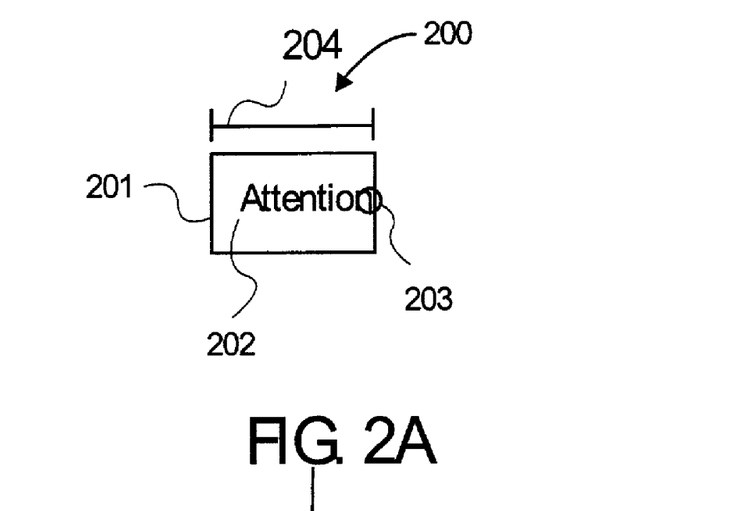
FIG. 2A illustrates an example of a geometry applied with attributes to form an object.

FIG. 2A illustrates an example of a geometry applied with attributes to form an object. In this example, the object 200 has geometry in the form of box 201. The box 201 is a flat geometric surface and may include multiple vertices. The object 200 has information in the form of the word 202 ("Attention"). As illustrated, the box 201 has a length 204 (referred to as "L"). The information attributes of the word 202 may include size of the characters in the word "Attention". There may also be other information attributes such as, for example, the characters being in capitalized form, etc. The geometry attributes of the object 200 may include the length "L" of the box 201.

The information attributes and the geometry attributes of the object 200 may be in contention, and as a result, may cause inaccurate portraying of the information associated with the object. For example, when there is a mismatch between the information attributes of the word 202 (in term of the size of the characters of the word "Attention") and the geometry attributes of the object 200 (in term of the length "L" of the box 201), part of the word 202 is cut off by the box 201, as illustrated in FIG. 2A. Area 203 is the space in the object 200 where contention exists between the word 202 (i.e., the information) and the box 201 (i.e., the geometry).

Figure 2B:
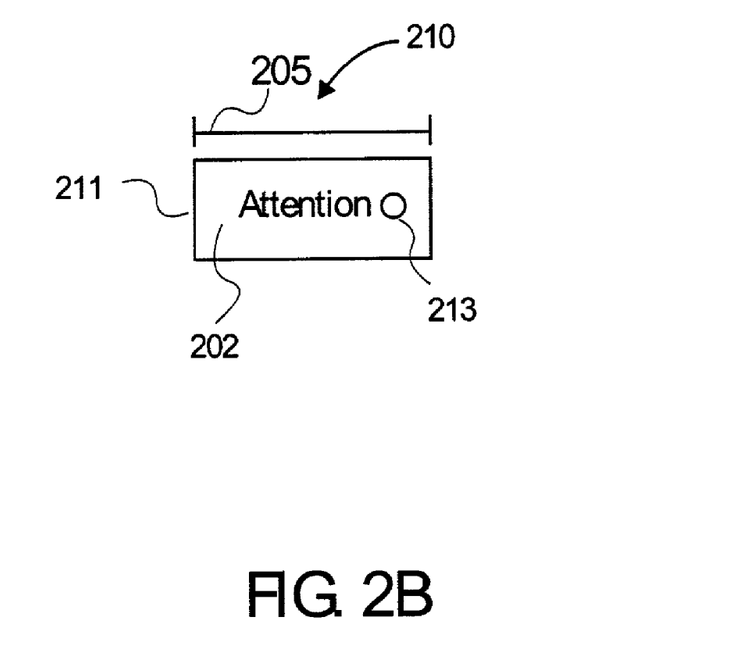
FIG. 2B illustrates an example of a geometry having its attributes modified to match with information attributes.

In one embodiment, the contention between the information attributes and the geometry attributes can be avoided by modifying the geometry attributes to match with the information attributes. FIG. 2B illustrates an example of a geometry having its attributes modified to match with information attributes. In this example, when it is determined that contention or mismatch may occur between information attributes (the size of the characters in the word 202) and the geometry attributes (the length "L" of the box 201 in FIG. 2A), the length "L" of the geometry attributes is extended to length 205 (referred to as "L+X", where "X" is a length of an extension to the length "L"). The modified length ("L+X") is used to form box 210, as illustrated in FIG. 2B. Note that the information or the word 202 ("Attention") has the same information attributes in FIG. 2B and in FIG. 2A. By modifying the geometry of the box 210, the information in the word 202 fits in the box 210 proportionally without any loss of "informative" content. As illustrated in FIG. 2B, the space 213 between the word 202 ("Attention") and the right edge of the box 210 allows the "informative" content of the word 202 to be appreciated. The background attributes can then be used to fill the rest of the geometry.

Although the geometry of the objects 200 and 210 illustrated in FIGS. 2A and 2B is a box that encloses the word 202 ("Attention"), the methods of modifying the geometry attributes may also be applied with other geometries and other types of information. For example, the other geometries may be in the forms of 3-D objects, triangles, circles, globes, and other known geometrical shapes. The other types of information may include logos, images, video, and any other medium that may convey meaning to its audience.

Figure 3:
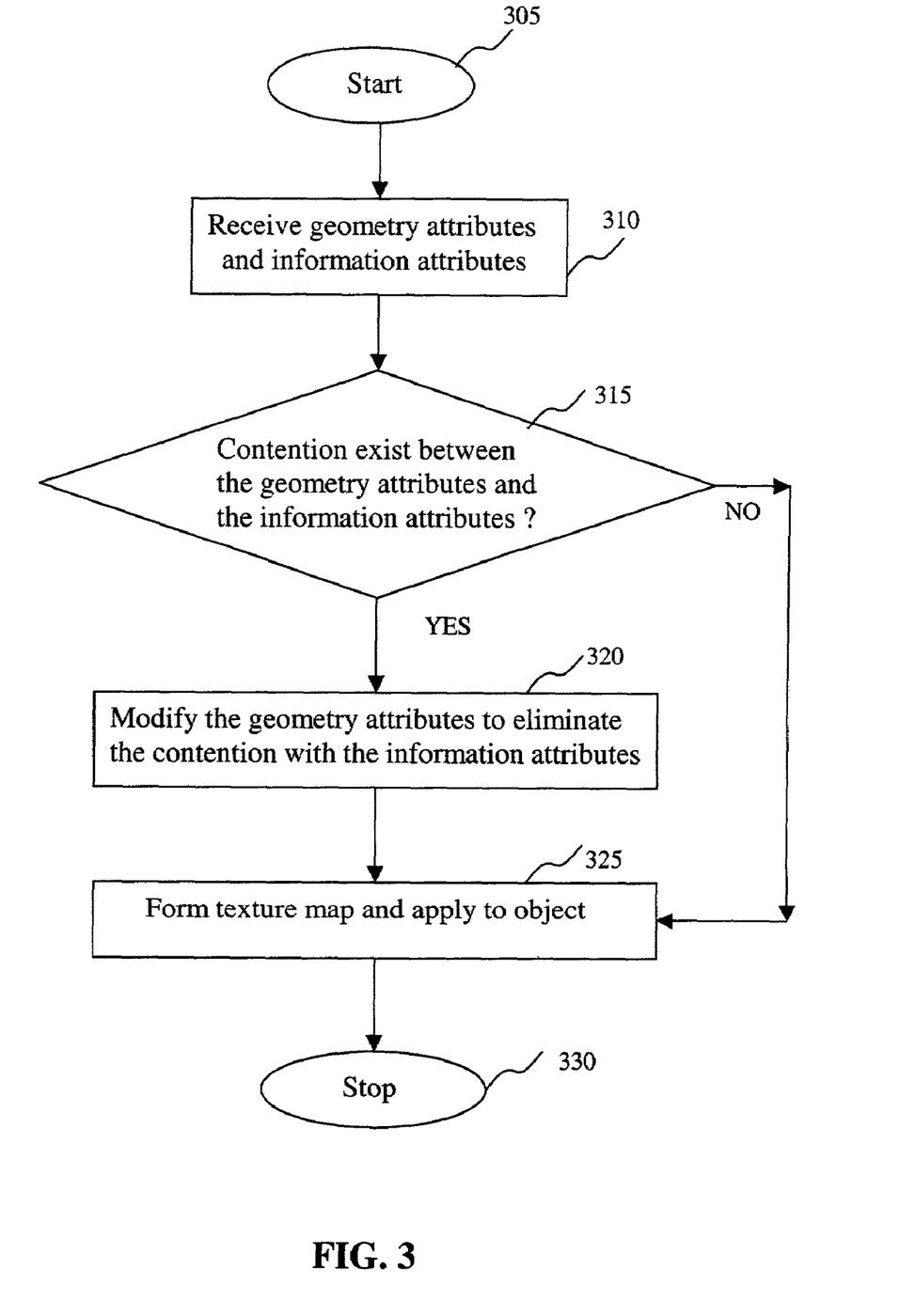
FIG. 3 is a flow diagram illustrating a geometry modification process in accordance with one embodiment of the present invention.

FIG. 3 is a flow diagram illustrating a geometry modification process in accordance with one embodiment of the present invention. The process starts at block 305. At block 310, the geometry attributes and the information attributes for an object are received. As described above, the geometry attributes may be associated with different types of geometrical shapes, and the information attributes may be associated with different types of information.

At block 315, a determination is performed to find out if contention exists between the geometry attributes and the information attributes. Contention may exist if applying the geometry attributes and the information attributes to the object causes the object to fail to portray the information as it is desired to do.

From block 315, when there is no contention between the geometry attributes and the information attributes, the process flows to block 325 where the geometry attributes and the information attributes are used to form the texture map to be applied to the object.

From block 315, when there is contention between the geometry attributes and the information attributes, the process flows to block 320 where the geometry attributes are modified to match with the information attributes and to reduce the contention. At block 325, the modified geometry attributes and the information attributes are used to form a texture map to be applied to the object. The process stops at block 330.

Although the process described in FIG. 3 is described with geometry attributes and information attributes, one skilled in the art would recognize that the process is applicable when contention exists with at least one single geometry attribute and at least one single information attribute, and that other background information may also be used to form the texture map.

Figure 4:
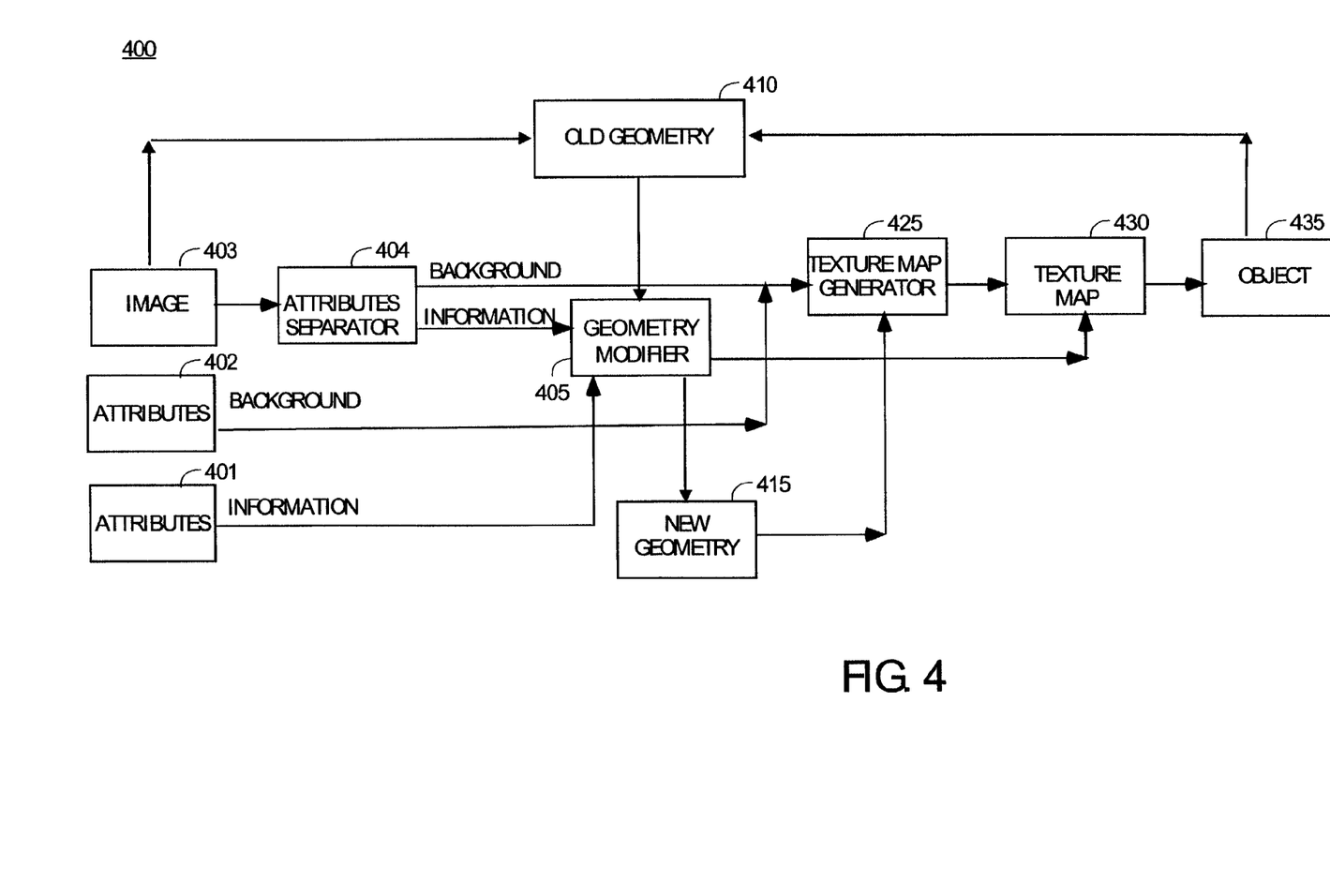
FIG. 4 is a block diagram illustrating geometry attributes modifying system in accordance to one embodiment of the present invention.

FIG. 4 is a block diagram illustrating geometry attributes modifying system in accordance to one embodiment of the present invention. The system 400 may receive information attributes 401 and background attributes 402. The system may also receive an image 403, which is then processed by an attributes separator 404 into background attributes and information attributes.

In either case, the information attribute is transmitted to a geometry modifier 405. The geometry modifier 405 may use the information attribute to modify an existing or "old" geometry 410. Attributes of the existing geometry may be derived from the image 403 or from the object 435. The geometry modifier 405 may then modify components of the geometry attributes or it may create new geometry attributes for the object based on the information attribute 401 or the information attributes provided by the attributes separator 404. The product of the geometry modifier 405 is the new geometry 415.

The new geometry 415 and the background attributes 402 or the background attributes provided by the attributes separator 404 are combined by a texture map generator 425 to create a texture map 430. The texture map 430 is then combined with the information attributes from the geometry modifier 405 to form a combined finished object 435. Although not shown, one skilled in the art would recognize that the system 400 may also include a processor, memory (e.g., RAM), storage media (e.g., disk drives), etc.

In some situations, there may be more than one texture map associated with an object. For example, a 3-D object may have multiple texture maps. Some of the texture maps may be generated to produce a visual "impression," while other texture maps may consist of "information" in the form of text or images. In one embodiment, the geometry attributes may be modified based on the informative textures. For example, a 3-D parallelepiped (a solid with six faces, each of which is a parallelogram), may be associated with three different informative textures including (1) an impression texture (e.g., marble), (2) an informative image that represents a movie poster, and (3) an informative image that represents a movie name (e.g., "For the Love of the Game").

In these situations, there may be different strategies to modify the geometry attributes. One strategy may require keeping the parallelepiped a constant size and change the informative images if, for example, they do not fit into the front side of the parallelepiped. Using this strategy, in a case where the informative image is, for example, a movie poster, the poster then needs to be resized to fit the geometry. In a case where the image is a movie name, the movie name then may need to be truncated to fit the geometry. Another strategy may require resizing the parallelepiped, depending on one element of the content, as follows:

new size=min(maxConstrainSize, moviePosterSize) or new size=min(maxConstrainSize, movieNameSize)

Having multiple texture maps may require a special management device to make a geometry modification decision. For example, when the informative textures are generated from a real-time database, the database fields may need to be converted into an HTML document. The HTML document may then be converted into an image.

Depending on some of the field parameters, various decisions about geometry form, size, or pipeline parameters may have to be made. Following are some examples of decisions that may need to be ma de for each one of various types of TV events to accommodate the appropriate information attributes.

Sports: change geometry from parallelepiped form to elliptic form.

Music: make the 3-D object semi-transparent.

Movie: position specular spot on top of geometry.

Sports movie: concatenate solutions and make geometry spherical and specular lighted.

Adult programming: hide geometry completely.

Sport soccer program: geometry will be a sphere with soccer-type impression texture Baseball program: geometry will be in the form of baseball bat and team names will be mapped on top of that bat.

Figure 5:
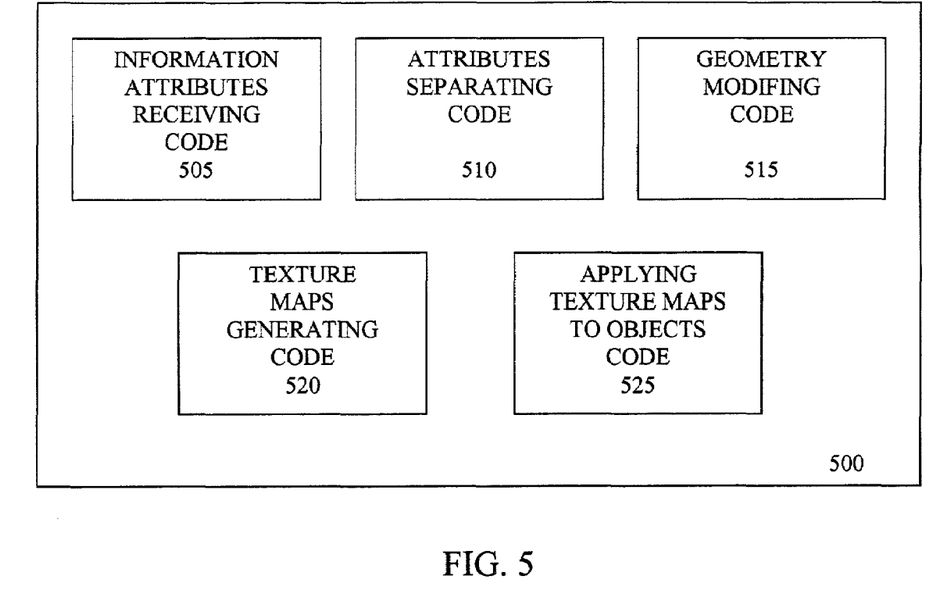
FIG. 5 illustrates an example of a machine-readable storage media in accordance with one embodiment of the present invention.

The operations of the various methods of the present invention may be implemented by a processing unit in a digital processing system, which executes sequences of computer program instructions which are stored in a memory which may be considered to be a machine-readable storage media. FIG. 5 illustrates an example of a machine-readable storage media in accordance with one embodiment of the present invention. The machine-readable storage medium 500 may include an information attributes receiving code 505 for receiving one or more information attributes to be applied to objects. Other codes that may be included in the machine-readable storage medium 500 includes an attributes separating code 510 for separating background attributes and information attributes, a geometry modifying code 515 for modifying an existing geometry to accommodate the information attributes, a texture-map generating code 520 for generating texture maps using the information attributes, the new geometry attributes, and the background attributes, and a texture-map application code 525 for applying the texture maps to the objects.

The memory in the digital processing system may be random access memory, read only memory, a persistent storage memory, such as mass storage device or any combination of these devices. Execution of the sequences of instruction causes the processing unit to perform operations according to the present invention. The instructions may be loaded into memory of the computer from a storage device or from one or more other digital processing systems (e.g. a server computer system) over a network connection. The instructions may be stored concurrently in several storage devices (e.g. DRAM and a hard disk, such as virtual memory). Consequently, the execution of these instructions may be performed directly by the processing unit.

In other cases, the instructions may not be performed directly or they may not be directly executable by the processing unit. Under these circumstances, the executions may be executed by causing the processor to execute an interpreter that interprets the instructions, or by causing the processor to execute instructions which convert the received instructions to instructions which can be directly executed by the processor. In other embodiments, hard-wired circuitry may be used in place of or in combination with software instructions to implement the present invention. Thus, the present invention is not limited to any specific combination of hardware circuitry and software, nor to any particular source for the instructions executed by the computer or digital processing system.

The methods of the present invention allows meaningful information, such as, for example, a word that needs to appear within an object, to be displayed as part of the object with minimal loss of the meaning or impact to the information. By modifying the geometry, such as, for example, expanding the geometry of the object, the word appears in its intended size within the object, instead of being shrunken to fit into the old geometry of the object.

Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A method of modifying object geometry comprising:
   receiving one or more information attributes to be applied to an object:
   determining if the one or more information attributes are in contention with one or more geometry attributes of the object; and
   when the one or more information attributes are in contention with the one or more geometry attributes, modifying the one or more geometry attributes to reduce the contention with the one or more information attributes,
   wherein the geometry attribute is a visible defined geometric space on a display and the information attribute is related to data presented within the visible geometric space; and
   combining the modified geometry attributes and the information attributes to form a texture map.

2. A computer readable medium having stored thereon sequences of instructions which are executable by a system, and which, when executed by the system, cause the system to perform a method, comprising:
   receiving one or more information attributes to be applied to an object;
   determining if the one or more information attributes are in contention with one or more geometry attributes of the object;
   when the one or more information attributes are in contention with the one or more geometry attributes, modifying the one or more geometry attributes to reduce the contention with the one or more information attributes,
   wherein the geometry attribute is a visible defined geometric space on a display and the information attribute is related to data presented within the visible geometric space; and
   combining the modified geometry attributes and the information attributes to form a texture map.

3. A system, comprising:
   a processor;
   a memory coupled to the processor;
   a storage device coupled to the memory and the processor, the storage device comprising:
   a geometry modifying code to modify one or more geometry attributes of an object to create new geometry attributes that reduce contention with one or more information attributes of the object; and
   a texture map generating code to combine the new geometry attributes with the one or more information attributes to create a texture map to be applied to the object, wherein the geometry attribute is a visible defined geometric space on a display and the information attribute is related to data presented within the visible geometric space.

4. The system of claim 3, wherein the storage device further comprising: an information attribute receiving code to receive the information attributes to create the texture map.

5. The system of claim 3, wherein the geometry modifying code modifies the one or more geometry attributes of the object to preserve informative content of the information attributes.

6. A graphics pipeline apparatus, comprising:
a geometry modifier operable to modify one or more geometry attributes of an object to create new geometry attributes that reduce contention with one or more information attributes of the object; and
a texture map generator operable to combine the new geometry attributes with the one or more information attributes to create a texture map for the object,
wherein the geometry attribute is a visible defined geometric space on a display and the information attribute is related to data presented within the visible geometric space.

7. The apparatus of claim 6, further comprising:
an information attribute receiver operable to receive the one or more information attributes to create the texture map.

8. The apparatus of claim 7, wherein the information attribute receiver includes an attribute separator to separate the information attributes from background attributes.

9. The apparatus of claim 6, wherein the geometry modifier modifies the one or more geometry attributes of the object to preserve informative content of the information attributes.

10. An apparatus comprising:
means for modifying at least one geometry attribute of an object to preserve informative content of one or more information attributes; and
means for forming a texture map using the modified geometry attribute and the one or more information attributes,
wherein the geometry attribute is a visible defined geometric space on a display and the information attribute is related to data presented within the visible geometric space.

11. The apparatus of claim 10, further comprising means for receiving the one or more information attributes.

12. The apparatus of claim 10, wherein the informative content of the one or more information attributes is preserved by reducing contention between the geometry attribute and the one or more information attributes.

* * * * *